3,036,094
1-PHENYL-2-AZIDOACYLAMINO-1.3-PROPANE DIOLS

Werner Meiser, Wuppertal-Elberfeld, Germany, assignor to Farbenfabriken Bayer Aktiengesellschaft, Leverkusen, Germany, a corporation of Germany
No Drawing. Filed July 18, 1956, Ser. No. 598,498
Claims priority, application Germany Aug. 8, 1955
5 Claims. (Cl. 260—349)

The present invention relates to threo-1-phenyl-2-azidoacylamino-1.3-propane diols and more particularly to a novel and economical process of producing the same.

In a copending application Serial No. 561,642, filed by Meiser and Domagk, now abandoned, there are described new 1-phenyl-2-azidoacetylaminopropane diols, which are useful in combatting bacterial and viral infections.

It is an object of the present invention to provide a novel process for the production of these 1-phenyl-2-azidoacetylamino-propane diols.

A further object is the provision of a new class of N-azidoacetyl-β-phenyl serines which are useful as intermediates for the production of the 2-azido acetyl-aminopropane diols. Still further objects will become apparent as the following specification proceeds.

New derivatives of N-phenyl serines may be obtained by either reacting phenyl serines or their esters or their functional derivatives modified in the hydroxy and/or amino group such as acyl-compounds or Schiff's bases, which phenyl serines etc. may be substituted in the p-position of the phenyl radical by a nitro-group, with azido alkanoic acids or reactive derivatives thereof.

The same compounds may be obtained by reacting N-halo-acyl-phenyl serines, which may be substituted in the p-position by a nitro group, or their esters or their functional derivatives modified in the hydroxy group, with alkali metal, or alkaline earth metal azides.

If the nitro group is not already present in the starting material, it may be introduced by subsequent nitration, if desired, after protecting the hydroxy group against the action of the nitrating agent.

Phenyl serines or their esters exist in six different forms since they have two asymetrical carbon atoms (two racemic and four optically active forms), the D- or L- or D-L-form of the threo- or erythro series. All these forms may be employed as starting materials according to the invention, the threo-form being preferred.

The phenyl serines or their esters may be employed also in the form of their functional derivatives, such as O-acyl compounds or their N-derivatives, like their Schiff's bases, oxazolidines and the like. These functional derivatives are advantageously employed if the nitro group is introduced subsequently. If necessary the substituents at the hydroxyl- and/or amino groups may be split off again.

As acylating derivatives of the azido alkanoic acids the acid halides, -anhydrides, -imino ethers, -esters, -nitriles or -amides have proved suitable for the reaction with phenyl serines or their esters under suitable conditions. Also the azido alkanoic acids themselves can be reacted with phenyl serines by azeotropic distillation.

The reaction of azides with N-halo-acyl compounds of the phenyl serines or their esters or functional derivatives respectively can be carried out in any optional solvent, also in the presence of water. The reaction is carried out especially easily in alcohol/water, dioxane/water, dimethyl formamide/water or in similar solvent mixtures. Acetonitrile is also a good solvent.

The reaction of azidoacyl imino ethers with phenylserines or their esters can be carried out by recovering the oxazolines obtained as intermediates or directly without isolating of the same, whereupon N-azidoacyl phenylserines are obtained.

I have further found, that the N-azidoacyl-β-phenylserines nitrated in p-position or their functional derivatives, modified in the carboxylic acid group, like esters, chlorides, azides can be reduced to carbinols selectively at the carboxyl group in good yields, without the nitro and azido group being attacked, by employing as reducing agents complex metal hydrides. Thus, 1-p-nitrophenyl-2-azidoacyl amino propane-1.3-diols (described for the first time in our U.S. patent application Serial No. 561,642) are obtained, which are therapeutically highly valuable substances.

It is known that the nitro group can be protected under certain conditions from reduction when employing complex metal hydrides (compare A. Dornow and A. Winter, B. 84, page 308 (1951)).

It was, however, surprising that the azido group which is very unstable in reductive processes, can be left unaffected by the reduction.

The reduction of the N-azido-acyl-β-phenylserines which may be nitrated in p-position can be carried out in anhydrous indifferent solvents, like for instance ether, tetrahydrofurane, dioxane, Cellosolve, methylal etc., as well as in hydroxyl-containing solvents, like for instance alcohols, glycols etc., depending upon the nature of the complex metal hydride employed. Even the presence of water is possible when using certain complex metal hydrides. The temperature of the reduction as well as the amount of the reducing agent may vary within wide limits. Thus, temperatures of from —25° C. to about 60° C. are possible, but a range of —15° C. to about room temperature is preferred.

Of the complex metal hydrides the alkali metal and alkaline earth aluminum hydrides, as for instance lithium aluminum hydride, magnesium aluminum hydride, calcium aluminum hydride, as well as the analogous boron hydrides, such as sodium boron hydride, potassium boron hydride, lithium boron hydride, calcium boron hydride, strontium boron hydride, barium boron hydride, aluminum boron hydride, may be employed. It is not even necessary that these substances which are partly obtainable only with difficulty should be employed in pure state. They can be obtained by double decomposition in statu nascendi from the readily available commercial sodium or potassium boron hydrides by reacting the same in an anhydrous solvent, like for instance ethanol, tetrahydrofurane, dioxane, with a corresponding alkali metal- or alkaline earth metal halide. The yields are as good as those obtained by applying the pure complex boron hydrides.

When the reaction is complete the metal complex is decomposed with water or dilute acids and worked up.

By derivatives of N-azidoacyl phenyl serines which may be nitro-substituted in the p-position, esters, acid chlorides acid azides should, for instance, be named. The N-azidoacetyl β-phenyl serines employed have the general formula

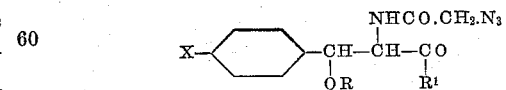

wherein X may be H or NO$_2$, R may be H or an acyl radical and R′ may be OH or O-Alkyl, Cl or N$_3$.

The complex metal hydride may be added to the phenyl serine derivative or the other way round the phenyl serine derivative may be added to the complex metal hydride.

Example 1

25.4 grams of D-L-threo-p-nitrophenyl serine ester (obtained according to "Berichte" 86, 496) are suspended in 254 milliliters of methylene chloride. To this suspension there are added gradually at room temperature 6 grams of azido acetyl chloride in 30 milliliters of methylene chloride. The mixture is stirred for a further two hours and then 100 milliliters of water and some hydrochloric acid are added. After sucking off and washing with water, 12.5% of a crude product of the melting point 132° C. are obtained, which after recrystallizing from a little ethyl acetate yields the D-L-threo-N-azido acetyl p-nitrophenyl serine ester of the melting point 140° C. in white crystals. Another small amount of this ester can be recovered from the methylene chloride layer after drying and recrystallizing from ethyl acetate.

From the hydrochloric acid layer the starting material used for binding the acid can be quantitatively recovered after filtration by precipitating with aqueous ammonia.

33.7 grams of D-L-threo-N-azidoacetyl-p-nitrophenyl serine ethylester are suspended in 200 milliliters of tetrahydrofurane. To the suspension 4 grams of sodium borohydride are added. The mixture is cooled to 2° C. and 15 grams of calcium iodide are added. Reaction and solution occur at once. The temperature is kept to below +20° C. After stirring for two hours at room temperature the mixture is poured on to 100 milliliters of 5 N-hydrochloric acid and 700 grams of ice. A clear solution is obtained which after standing for one hour is exhaustively extracted with ethyl acetate. After drying over sodium sulfate, the solvent is evaporated in vacuo and the residue boiled with ethylene chloride. The crystallizations obtained are again recrystallized from ethylene chloride. Thus, D-L-threo-1-p-nitrophenyl-2-azidoacetyl aminopropane-1,3-diol of the melting point 123° C. is obtained in beautiful white crystals.

If instead of the racemic compounds the L-(+)-threo-N-azidoacetyl-p-nitrophenyl serine ethyl ester is employed under analogous conditions, the D-(−)-threo-1-p-nitrophenyl-2-azidoacetyl amino propane-1.3-diol of the melting point 107° C. is obtained. [α]$_D$=−18° (1.6% in ethyl acetate); [α]$_D$=+15° (5% in methanol).

*Example 2*

12.5 grams of D-L-threo-p-nitrophenyl serine ester are suspended in 125 milliliters of methylene chloride and mixed with 11 grams of dimethyl aniline. 6 grams of azidoacetyl chloride in 30 milliliters of methylene chloride are added thereto within about one hour at 0° C. After stirring the mixture for about one hour at 0° C., ice water and dilute acetic acid is added thereto. The mixture is sucked off and washed with water. 14.5 grams of a crude product, are obtained, which arter recrystallization from ethyl acetate yields 12.5 grams of the compound obtained according to Example 1, with the melting point of 140° C. A small amount of the product (1.5 grams) can still be recovered from the methylene chloride layer.

If instead of the racemic threo-p-nitrophenyl-serine ester their optically active isomers are employed, the corresponding optically active compounds are obtained.

33.7 grams of D-L-threo-N-azidoacetyl-nitrophenyl serine ethyl ester are suspended in 150 milliliters of tetrahydrofurane and cooled with ice to about 0° C. 10.5 grams of calcium borohydride which crystallizes with 2 mols of tetrahydrofurane, are added in substance or in tetrahydrofurane solution, whereupon reaction and quick solution occur. The reaction is stopped at 20° C. and the mixture stirred for a further two hours. Analogously to Example 1 dilute hydrochloric acid is added and D-L-threo-1-p-nitrophenyl-2-azidoacetyl-aminopropane-1.3-diol is recovered with a melting point of 123° C.

*Example 3*

10.45 grams of D-L-threo-phenylserine ester (melting point 82° C.) are dissolved with 120 milliliters of methylene chloride and mixed with 11 grams of dimethyl aniline. 6 grams of azidioacetyl chloride in 20 milliliters of methylene chloride are gradually added thereto at 0° C. The mixture is stirred for a further two hours at 0° C. and then washed with dilute hydrochloric acid and water. After drying over sodium sulfate the solvent is distilled off and the solid residue is recrystallized from ethylene chloride. The R-L-threo-N-axido-acetyl phenyl serine ester is obtained in white crystals of the melting point 112° C.

2.92 grams of D-L-threo-N-azidoacetyl phenyl serine ester are added to a mixture of 10 milliliters of acetic anhydride and 10 milliliters of pyridine. Solution occurs at one and soon crystallization sets in again. After standing for some hours the mixture is shortly heated to 60° C. and poured after cooling into 100 milliliters of ice water. The product is sucked off and then recrystallized from dilute methanol. The D-L-threo-N-azidoacetyl-O-acetyl phenyl serine ester is obtained in white crystals of the melting point 182° C.

20 grams of D-L-threo-N-azidoacetyl-O-acetyl phenyl serine ester are introduced at 0° C. to 25 milliliters of nitric acid (1.51) and 25 milliliters of concentrated sulfuric acid. The mixture is then stirred for a further two hours at 0° C. It is poured into 700 milliliters of ice water and the oil which crystallizes soon is sucked off and washed. After recrystallization from dilute alcohol white crystals are obtained of the D-L-threo-N-azidoacetyl-O-acetyl-1-nitrophenyl serine ester of the melting point 147° C.

By hydrolysis with sodium hydroxide solution and acetone at 0° C. the ester can be converted into the D-L-threo-N-azidoacetyl-p-nitro-phenyl serine ester of Example 1.

33.7 grams of D-L-threo-N-azidoacetyl-p-nitrophenyl serine ethyl ester are suspended in 200 milliliters of tetrahydrofurane and mixed while stirring with 4 grams of sodium borohydride. The mixture is cooled to −10° C. and 17 grams of lithium iodide (LiI.2H$_2$O) are added thereto. Reaction and solution occur at once. The mixture is stirred for one hour at 0° C., then brought up to 20° C. after about one hour and stirred for 3.5 hours at this temperature. The tetrahydrofurane is distilled off in vacuo at 25° C. and the residue is mixed with 100 milliliters of 5-N-hydrochloric acid and 350 grams of ice water. A solution is obtained, which crystallizes soon. After sucking off and drying the solid is recrystallized from ethylene chloride. The D-L-threo-1-p-nitrophenyl-2-azidoacetyl amino propane-1.3-diol is again obtained in white crystals of the melting point 123° C.

*Example 4*

2.52 grams of sodium borohydride and 3.8 grams of anhydrous calcium chloride are stirred in 150 milliliters of absolute alcohol at 0° C. for ten minutes and then mixed with 21.3 grams of L-(+)-threo-N-azidoacetyl-p-nitrophenyl serine ethyl ester, dissolved in 200 milliliters of absolute alcohol, in such manner that the temperature does not rise over about 0° C. Thereupon the mixture is stirred for a further three hours at about 0° C., and a further four hours at room temperature. The alcohol is removed in a vacuum at about 25° C. and the residue is mixed with 70 milliliters of 5 N-hydrochloric acid and 250 milliliters of ice water. After standing over night the crystals formed are sucked off and washed with a little water. The D-(−)-threo-1-p-nitrophenyl-2-azidoacetyl aminopropane-1.3-diol of the melting point 107° C. is obtained in white crystals by recrystallization from ethylene chloride. A small amount of the substance can still be recovered from the aqueous lye by shaking out with ethyl acetate.

If instead of the L-(+)-threo-N-azidoacetyl-p-nitrophenyl serine ethyl ester the racemic compound, D-L-threo-N-azidoacetyl-p-nitrophenyl serine ethyl ester is employed, the D-L-threo-1-p-nitrophenyl-2-azidoacetyl amino propane-1.3-diol of the melting point 123° C. is obtained under completely analogous conditions.

Example 5

2.92 grams of D-L-threo-N-azidoacetyl phenyl serine ethyl ester are dissolved in 20 milliliters of tetrahydrofurane and mixed with 0.4 gram of sodium borohydride. The mixture is cooled to 0° C. 1.5 grams of anhydrous calcium iodide are then added. Reaction and solution occur. The temperature is kept below 20° C. by cooling. After standing for three hours at room temperature the mixture is poured into 10 milliliters of 5 N-hydrochloric acid and 70 grams of ice water and left to stand for some time. The solution is then several times extracted with ethyl acetate, dried over sodium sulfate and the solvent is distilled off in vacuo. D-L-threo-1-phenyl-2-azidoacetyl aminopropane-1.3-diol is obtained as an oil. If this oil is mixed with 4.6 milliliters of pyridine and 4.6 milliliters of acetic acid anhydride, heated for 40 minutes on the water bath, and the excess of the solvent is distilled off in vacuo, the D-L-threo-1-phenyl-1.3-diacetoxy-2-azidoacetyl amino propane is obtained in beautiful crystals of the melting point 98° C. after recrystallization from 96% alcohol. This product can be nitrated and further worked up according to U.S. application Serial No. 561,642.

Example 6

35 grams of D-L-threo-N-chloroacetyl-p-nitrophenyl serine ester (melting point 130° C., obtained from D-L-threo-p-nitrophenyl serine ester and chloroacetyl chloride in the presence of a base) are refluxed with stirring for 14 hours with 70 milliliters of ethanol, 10 grams of sodium azide and 10 milliliters of water. After cooling the mixture is diluted with water and sucked off. The D-L-threo-N-azidoacetyl-p-nitrophenyl serine ester of the melting point 140° C. is obtained in white crystals after recrystallizing from dilute ethanol.

0.38 gram of sodium borohydride and 0.422 gram of anhydrous lithium chloride are stirred in 25 milliliters of absolute ethanol at −10° C. and added to 3.37 grams of D-L-threo-N-azidoacetyl-p-nitrophenyl serine ethyl ester dissolved in 30 milliliters of dry ethanol, in such a manner that the temperature does not substantially exceed 0° C. The mixture is then stirred for one hour at 0° C. and for four hours at room temperature. The alcohol is removed in vacuo at about 25° C. and the residue is mixed with 10 milliliters of 5 N-hydrochloric acid and 35 milliliters of ice water. The crystallization, which occurs at once, is sucked off after two hours and washed with a little water.

D-L-threo-1-p-nitrophenyl-2-azidoacetyl amino propane-1.3-diol of the melting point 123° C. is obtained in white crystals after recrystallization from ethylene chloride. From the aqueous lye some more of this compound can be recovered by extraction with ethyl acetate. If instead of the racemic compound the D-(−)-threo-N-azidoacetyl-p-nitrophenyl serine ethyl ester is employed, the D-(+)-threo-1-p-nitrophenyl-2-azidoacetylamino propane-1.3-diol of the melting point 107° C. is obtained under completely analogous conditions.

Example 7

1.7 grams of D-L-threo-N-azidoacetyl-p-nitrophenyl serine ethyl ester are stirred with 10 milliliters of tetrahydrofurane and mixed with 0.2 gram of sodium borohydride while cooling with ice. Thereupon, a solution of 0.75 gram of calcium iodide in 2.5 milliliters of water are added dropwise, whereupon reaction occurs forming a milky suspension. The mixture is stirred for a further five hours while cooling with ice and the solvent is then extracted in vacuo. The residue is mixed with 2.5 milliliters of 5 N-hydrochloric acid and 16 milliliters of ice water. The crystallization, which occurs at once, is sucked off after some time and washed. D-L-threo-1-p-nitrophenyl-2-azidoacetyl aminopropane-1.3-diol of the melting point 123° C. is obtained upon recrystallization from ethylene chloride.

Example 8

1.7 grams of D-(−)-threo-N-azidoacetyl-p-nitrophenyl serine ethyl ester are suspended in 10 milliliters of tetrahydrofurane. At 10° C. 110 milligrams of lithium borohydride in 5 milliliters of tetrahydrofurane are added thereto. The mixture is then stirred for a further five hours at 20–25° C. The solvent is distilled off in vacuo and the residue is mixed with 4 milliliters of 5 N-hydrochloric acid and 17 milliliters of ice water. After four hours the solid is sucked off and washed. The L-(+)-threo-1-p-nitrophenyl-2-azidoacetyl aminopropane-1.3-diol of the melting point 107° C. is obtained in beautiful crystals by recrystallization from ethylene chloride.

Example 9

2 grams of sodium borohydride and 4.8 grams of anhydrous barium chloride (freed in water in vacuo at 180° C.) are stirred in 130 milliliters of absolute ethanol at −15° C. The mixture is added to 17 grams of D-L-threo-azidoacetyl-p-nitrophenyl serine ethyl ester in 150 milliliters of alcohol in such a manner, that the temperature does not exceed 0° C. The reaction mixture is stirred for one hour at this temperature and subsequently stirred for six hours at room temperature. The alcohol is distilled off in vacuo. The mixture is then poured into 50 milliliters of 5 N-hydrochloric acid and 150 milliliters of ice water. The separating oil crystallizes after standing over night and is sucked off and washed with water. The D-L-threo-1-p-nitrophenyl-2-azidoacetyl amino propane-1.3-diol of the melting point 123° C. is obtained after recrystallization from ethylene chloride.

Example 10

2 grams of sodium borohydride and 2.5 grams of magnesium chloride (dehydrated in a stream of hydrogen chloride at 190° C.) are stirred in 130 milliliters of absolute alcohol at −10° C. Then, 17 grams of D-L-threo-N-azidoacetyl-p-nitrophenyl serine ethyl ester are added in 150 milliliters of absolute alcohol. The temperature rises to +5° C. The mixture is stirred for one hour at −10° C., one hour at 0° C. and then 20 hours at room temperature. The alcohol is distilled in vacuo and the residue is decomposed with 45 milliliters of 5 N-hydrochloric acid and 160 milliliters of ice water. The crystallization occurs at once, is sucked off after two hours and recrystallized from ethylene chloride. D-L-threo-1-p-nitrophenyl-2-azidoacetyl amino propane-1.3-diol of a melting point 123° C. is obtained.

Example 11

1.31 grams of D-L-threo-N-azidoacetyl-p-nitrophenyl serine ethyl ester are dissolved in 50 milliliters of tetrahydrofurane and dropped into a solution of 0.38 gram of lithium aluminum hydride in 20 milliliters of absolute ether at −10° C. The mixture is subsequently stirred for six hours at 0° C. Then the solution is mixed with 20 milliliters of 3 N-acetic acid and the solvent evaporated in vacuo. The residue is repeatedly extracted with warm water and the solution is extracted in the extractor with ethyl acetate free from alcohol. After drying over sodium sulfate the solution is strongly concentrated and chromatographed on an aluminum oxide column. It is eluted with ethyl acetate and the solvent evaporated in vacuo. The residue is recrystallized from ethylene chloride. D-L-threo-1-p-nitrophenyl-2-azidoacetyl amino propane-1.3-diol of a melting point 121° C. is obtained.

Example 12

1.7 grams of D-L-threo-N-azidoacetyl-p-nitrophenyl serine ethyl ester are dissolved in 25 milliliters of absolute alcohol at 40° C. 0.2 gram of sodium borohydride in 12 milliliters of absolute alcohol is dropped into the solution. The reaction mixture is heated to 60° C. within two hours and stirred for three hours. The solvent is distilled off in vacuo. The residue is decomposed with 5 milliliters of 5 N-acetic acid and 15 milliliters of ice water. The solution crystallizes after standing over night in the refrigerator and is sucked off and the residue recrystallized from ethylene chloride. D-L-threo-1-p-nitrophenyl-2-azidoacetyl amino propane-1,3-diol in white crystals of the melting point 123° C. is obtained.

If 1.7 grams of the esters are dissolved in 35 milliliters of absolute ethanol and 0.2 gram of sodium borohydride is added in 12 milliliters of absolute alcohol and subsequently stirred for 24 hours at room temperature, an analogous result is obtained.

*Example 13*

11.5 grams of D-L-threo-N-azidoacetyl-p-nitrophenyl serine hydrazide (prepared from the ester and hydrazine hydrate in absolute alcohol, decomposition point 185° C.) are dissolved in 130 milliliters of N/1-sulfuric acid, cooled down to 0° C. and 3 grams of sodium nitrite are added dropwise in 10 milliliters of water. The precipitate is stirred with ice for 1½ hours and the D-L-threo-N-azidoacetyl-p-nitrophenyl serine azide obtained is taken up in ethyl acetate. The ethyl acetate is once washed with water, filtered and mixed with stirring with a solution of 3 grams of sodium borohydride in 10 milliliters of water at −15° C. The temperature rises to −10° C. The mixture is stirred for half an hour at −10° C. and 1½ hours at −5° C. The layers are separated, shaken with ethyl acetate and the ethyl acetate is shaken with N-sulfuric acid and water. After drying over sodium sulfate and distilling in vacuo the residue is recrystallized from ethylene chloride. D-L-threo-1-p-nitrophenyl-2-azidoacetyl-amino-propane-1,3-diol in beautiful white crystals of the melting point 123° C. is obtained.

The sodium borohydride may also be added dropwise in 120 milliliters of absolute ethanol. When the dropping funnel is empty the cooling bath is taken away and the mixture is stirred for 24 hours at room temperature. The solvent is distilled off in vacuo and the residue is decomposed with 70 milliliters of 5 N-hydrochloric acid and 130 milliliters of ice water. The solution obtained crystallizes in the refrigerator. It is sucked off and the residue recrystallized from ethylene chloride. The product is obtained again in beautiful white crystals of the melting point 123° C.

*Example 14*

25.4 grams of D-L-threo-p-nitrophenyl serine ester are dissolved in 650 milliliters of methanol and stirred for 20 hours with 17 grams of azidoaceto-iminomethyl ether hydrochloride. The solvent is distilled off in vacuo. The residue is taken up in a little water and extracted with methylene chloride. After drying, the mixture is distilled off in vacuo and the residue is crystallized by addition of absolute ether. After recrystallization from dilute ethanol D-L-threo-2-azidomethyl-5-p-nitrophenyl-4-carbethoxy-oxazoline (decomposition point 134° C.) is obtained. By hydrolysis with water or with a dilute acid it is converted into the compound of Example 1.

7.2 grams of D-L-threo-2-azidomethyl-5-p-nitrophenyl-oxazoline-4-carboxylic acid ethyl ester are dissolved in 46 milliliters of tetrahydrofurane and mixed with 0.9 gram of sodium borohydride. After cooling to 0° C. 3.39 grams of calcium iodide are added. Then the mixture is stirred for two hours with ice cooling and then five hours at room temperature. Then it is decomposed with 200 milliliters of ice water and adjusted to a pH of 7 with dilute hydrochloric acid. After stirring for several hours the solution is completely extracted with ethyl acetate, dried over sodium sulfate and distilled off in vacuo. D-L-threo-2-azidomethyl - 5 - p-nitrophenyl-4-hydroxymethyl-oxazoline is obtained in white crystals of the melting point 118° C. It is converted by hydrolysis with water or a dilute mineral acid into the D-L-threo-1-p-nitrophenyl-2-azidoacetyl-amino-propane-1.3-diol of the melting point 123° C.

I claim:

1. The process of producing 1-phenyl-2-azidoacetyl-amino-1.3-propane diols of the formula

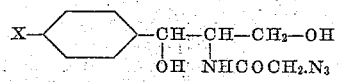

wherein X is a member of the group consisting of H and $NO_2$ which process comprises contacting in an organic solvent medium at a temperature not substantially exceeding 60° C. an N-azidoacetyl-$\beta$-phenyl serine of the formula

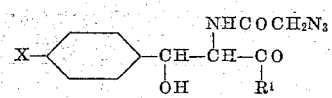

wherein X is a member of the group consisting of H and $NO_2$, and R′ is a member of the group consisting of —OH, —O— lower alkyl and —$N_3$ with a complex metal hydride selected from the group consisting of sodium and lithium boron hydride and lithium aluminum hydride and recovering the 1-phenyl-2-azidoacetylamino-1.3-propane diol from the reaction mixture.

2. The process according to claim 1 in which the N-azidoacetyl-$\beta$-phenyl serine is of the threo series.

3. The process according to claim 1 in which the complex metal hydride is sodium boron hydride.

4. The process according to claim 1 in which the complex metal hydride is lithium boron hydride.

5. The process according to claim 1 in which the complex metal hydride is lithium aluminum hydride.

References Cited in the file of this patent

UNITED STATES PATENTS

| | | |
|---|---|---|
| 2,699,451 | Moersch | Jan. 11, 1955 |
| 2,745,875 | Ehrhart et al. | May 15, 1956 |

FOREIGN PATENTS

| | | |
|---|---|---|
| 695,769 | Great Britain | Aug. 19, 1953 |
| 731,397 | Great Britain | June 8, 1955 |
| 1,068,620 | France | Feb. 10, 1954 |

OTHER REFERENCES

Carrara et al.: "J. Am. Chem. Soc.," vol. 74, Oct. 5, 1952, p. 4949.

Elphimoff-Felkin: "Comptes Rendus Acad. Sci.," vol. 234 (1952), pages 1789 to 1791.

Felkin: "Comptes Rendus Acad. Sci.," vol. 230 (1956), pp. 304 to 306.